(12) United States Patent
Silorio et al.

(10) Patent No.: US 11,837,905 B2
(45) Date of Patent: Dec. 5, 2023

(54) BATTERY CHARGER SYSTEM

(71) Applicant: CyberSwitchingPatents, LLC, San Jose, CA (US)

(72) Inventors: Ron Silorio, Pittsburg, CA (US); Charles Henry Reynolds, Morgan Hill, CA (US); Ximing Shi, Fremont, CA (US)

(73) Assignee: CyberSwitchingPatents, LLC, San Jose, CA (US)

( * ) Notice: Subject to any disclaimer, the term of this patent is extended or adjusted under 35 U.S.C. 154(b) by 75 days.

(21) Appl. No.: 17/330,185

(22) Filed: May 25, 2021

(65) Prior Publication Data
US 2022/0385089 A1 Dec. 1, 2022

(51) Int. Cl.
*H02J 7/00* (2006.01)
(52) U.S. Cl.
CPC ........ *H02J 7/00714* (2020.01); *H02J 7/0013* (2013.01); *H02J 7/0047* (2013.01)
(58) Field of Classification Search
CPC .................................................... H02J 7/0013
See application file for complete search history.

(56) References Cited

U.S. PATENT DOCUMENTS

| | | | |
|---|---|---|---|
| 5,028,859 A | 7/1991 | Johnson | |
| 7,816,886 B2 | 10/2010 | Brandon, II | |
| 8,181,043 B1 * | 5/2012 | Reynolds | H04L 12/12 361/679.01 |
| 9,610,844 B2 * | 4/2017 | Cho | B60R 16/03 |
| 10,623,328 B1 * | 4/2020 | Balachandran | H04L 47/6275 |
| 10,862,811 B1 * | 12/2020 | Balachandran | H04L 43/0852 |
| 2002/0057205 A1 * | 5/2002 | Reynolds | G06F 1/266 340/693.1 |
| 2002/0057206 A1 * | 5/2002 | Reynolds | G06F 1/266 340/3.1 |
| 2004/0047095 A1 * | 3/2004 | Reynolds | G06F 1/26 361/62 |
| 2004/0064198 A1 * | 4/2004 | Reynolds | G06F 1/266 700/286 |
| 2006/0028178 A1 * | 2/2006 | Hobbs | B60L 3/0046 320/128 |
| 2008/0019067 A1 * | 1/2008 | Reynolds | G06F 1/266 361/93.1 |

(Continued)

*Primary Examiner* — Drew A Dunn
*Assistant Examiner* — Tynese V Mcdaniel
(74) *Attorney, Agent, or Firm* — INNOVATION CAPITAL LAW GROUP, LLP; Vic Lin (57) ABSTRACT

A battery charger system includes multiple power channels to accommodate multiple battery chargers through a power input port. Each power channel includes a power outlet electrically coupled to the power input port through a relay. Each power channel further includes a current sensor. A controller is configured to estimate current in each of the power channels using the sensor signals, and configured to control the relays. The battery charger system is configured to provide power to the outlets by closing the corresponding relays, until the total current estimate is more than a maximum current limit, at which point the controller is configured to open the most recently closed relay. The controller is further configured to sequentially close remaining relays after the total current drops sufficiently, while maintaining the total current below the maximum current limit.

18 Claims, 8 Drawing Sheets

(56) References Cited

U.S. PATENT DOCUMENTS

| | | | |
|---|---|---|---|
| 2008/0019068 A1* | 1/2008 | Reynolds | G06F 1/266 361/93.1 |
| 2010/0213892 A1* | 8/2010 | DeSanctis | H02J 7/0013 320/107 |
| 2013/0100567 A1* | 4/2013 | Reynolds | H02H 3/08 361/93.1 |
| 2014/0254050 A1* | 9/2014 | Haines | H02H 3/16 361/42 |
| 2015/0351263 A1* | 12/2015 | DeSanctis | H05K 5/023 307/42 |
| 2016/0218536 A1* | 7/2016 | Caren | H02J 7/0044 |
| 2016/0362012 A1* | 12/2016 | Yao | H02J 3/322 |
| 2017/0033566 A1* | 2/2017 | Jursch | H02J 1/10 |
| 2017/0158067 A1* | 6/2017 | Reynolds | B60L 53/63 |
| 2017/0158071 A1* | 6/2017 | Reynolds | B60L 53/67 |
| 2017/0158075 A1* | 6/2017 | Reynolds | B60L 53/14 |
| 2017/0299215 A1* | 10/2017 | Li | H01H 85/0241 |
| 2018/0111493 A1* | 4/2018 | Chan | B60L 53/31 |
| 2018/0145378 A1* | 5/2018 | Fujita | H02J 7/0024 |
| 2018/0316199 A1* | 11/2018 | Lyons | H02J 7/0068 |
| 2019/0049036 A1* | 2/2019 | Narita | F16K 31/04 |
| 2019/0070970 A1* | 3/2019 | Chan | B60L 53/65 |
| 2019/0157872 A1* | 5/2019 | Taimela | H02J 3/241 |
| 2020/0152934 A1* | 5/2020 | O'Neil | H01M 50/204 |
| 2020/0169081 A1* | 5/2020 | Yasoshima | H02J 7/0018 |
| 2020/0169082 A1* | 5/2020 | Yasoshima | H02J 7/0013 |
| 2020/0386822 A1* | 12/2020 | Weiss | G01R 31/367 |
| 2021/0098946 A1* | 4/2021 | Davis | H05K 7/18 |
| 2021/0280029 A1* | 9/2021 | Gruber | G08B 13/19673 |
| 2021/0376620 A1* | 12/2021 | Fan | H01M 10/441 |
| 2021/0376645 A1* | 12/2021 | Fan | H02J 7/007182 |
| 2022/0146586 A1* | 5/2022 | Kang | H02J 7/0047 |
| 2022/0239113 A1* | 7/2022 | Tian | H02J 7/0047 |
| 2022/0247316 A1* | 8/2022 | Jiang | H02M 3/1584 |
| 2022/0247317 A1* | 8/2022 | Jiang | H02M 3/1584 |
| 2022/0285949 A1* | 9/2022 | Kuranuki | H01M 10/44 |

* cited by examiner

FIG. 6 though a relay. Each power channel further includes a current sensor which provides a sensor signal characteristic of current in the power channel. The relays and the current sensors are coupled to a controller, which is configured to estimate current in each of the power channels using the sensor signals, and configured to control the relays.

BATTERY CHARGER SYSTEM

FIELD

This disclosure relates to the field of battery charger systems. More particularly, but not exclusively, this disclosure relates to battery charger systems for multiple battery chargers.

BACKGROUND

Rechargeable batteries for tools and landscape equipment have proliferated in recent years. It is common for small businesses and individuals to have multiple rechargeable batteries for a variety of tools and equipment. Widely used batteries range in operating potential from 5 volts to 56 volts, and higher voltages are expected in future batteries. Similarly, the batteries range in capacity from 1 amp-hour to 30 amp-hours, and higher capacity batteries are expected. Batteries from different manufacturers and batteries having different operating potentials, usually require different chargers. Charging multiple batteries can present challenges, as concurrent charging of multiple batteries can easily exceed the current capacity of an outlet. Sequential charging of batteries having different designs requires operator action to disconnect charged batteries and connect uncharged batteries.

SUMMARY

The present disclosure introduces a battery charger system that includes multiple power channels to accommodate multiple battery chargers. The battery charger system has a power input port. Each power channel includes a power outlet electrically coupled to the power input port through a relay. Each power channel further includes a current sensor which provides a sensor signal characteristic of current in the power channel. The relays and the current sensors are coupled to a controller, which is configured to estimate current in each of the power channels using the sensor signals, and configured to control the relays.

The battery charger system is configured to provide power to the outlets by closing the corresponding relays, until a total current estimate is more than a maximum current limit, at which point the controller is configured to open the most recently closed relay. The controller is further configured to subsequently close that relay after the total current estimate drops sufficiently. The controller is configured to provide power to all the outlets in turn, while maintaining the total current estimate below the maximum current limit.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

A battery charger system is configured to provide power to multiple battery chargers while maintaining total current to the battery chargers below a maximum current limit. The maximum current limit may be set to avoid tripping a circuit breaker through which the battery charger system is powered. Commonly used circuit breakers for battery chargers have trip currents of 15 amps to 20 amps, and the maximum current limit is 70 percent to 90 percent of the trip current. The maximum current limit may be preset in a memory of the battery charger system. Alternatively, the maximum current limit may be updated by a user of the battery charger system, by a network connected to the battery charger system, or by other methods. Battery chargers commonly require a significant fraction of the maximum current limit, for example, 2 amps to 5 amps, when a battery begins charging, and require less current as charging of the battery progresses, culminating in a low current, for example less than 1 amp, when the battery is fully charged. The multiple battery chargers connected to the battery charger system may have a combined current draw that would exceed the maximum current limit if all the battery chargers started charging their batteries concurrently. The battery charger system is configured to maintain the total current below the maximum current limit by providing power to a subset of the battery chargers at any instant. When power is provided to a battery charger, resulting in the total current exceeding the maximum current limit, power is disconnected from the most recently powered battery charger, and power is restored to the disconnected battery charger when the total current drops below a threshold current limit. The threshold current limit is less than the maximum current limit by several amps. As batteries connected to the battery chargers become fully charged, current to those battery chargers lessens, and power is subsequently provided to remaining battery chargers, while maintaining total current below the maximum current limit.

Figure 1:
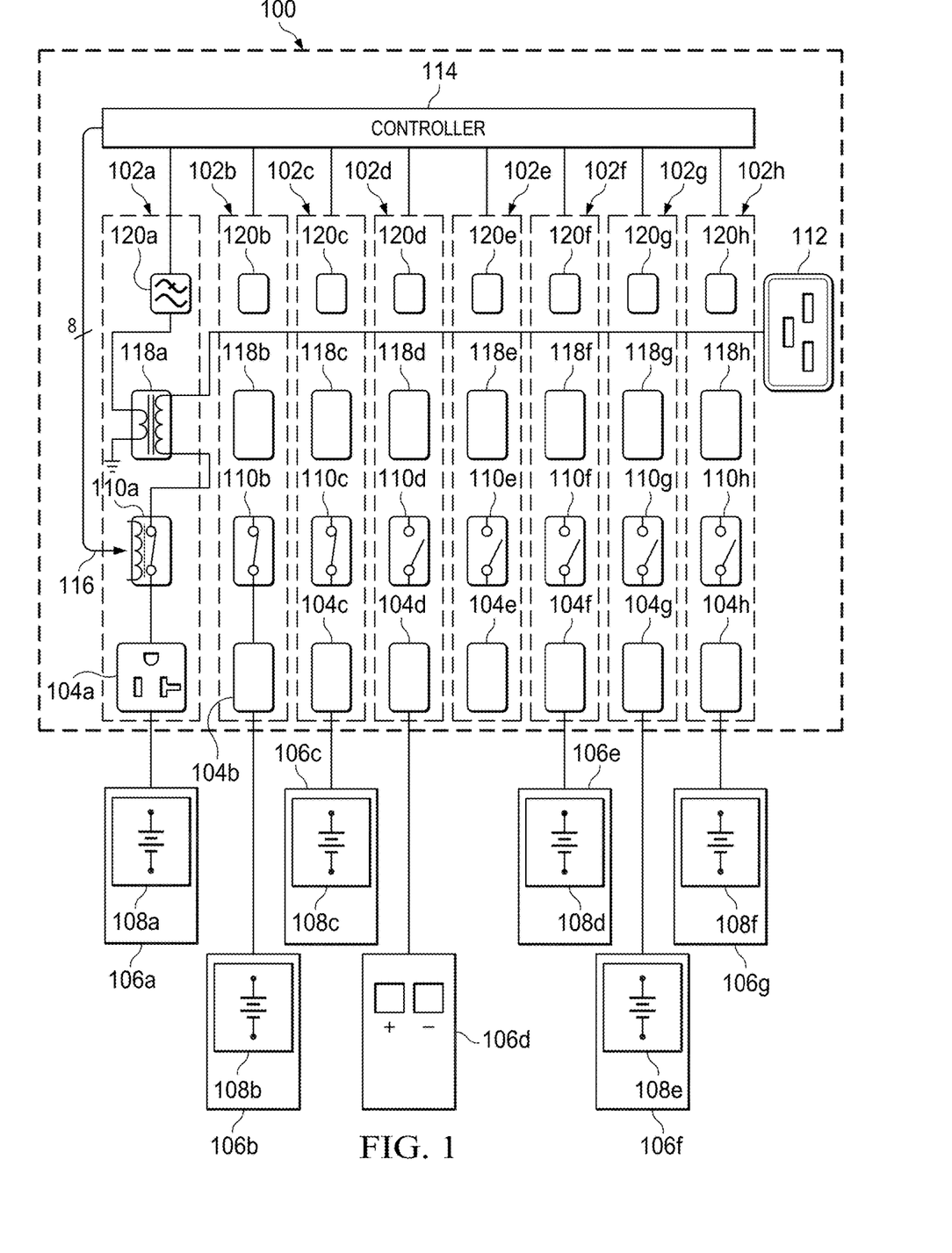
FIG. 1 depicts an example battery charger system, with multiple battery chargers connected to the battery charger system.

FIG. 1 depicts an example battery charger system, with multiple battery chargers connected to the battery charger system. The battery charger system 100 includes multiple power channels 102a through 102h. The battery charger system 100 of this example is depicted having eight of the power channels 102a through 102h, however, other example battery charger systems having more or fewer power channels are within the scope of this disclosure. Each of the power channels 102a through 102h includes a power outlet 104a through 104h. During operation of the battery charger system 100, the battery chargers 106a through 106g are plugged into the power outlets 104a through 104h. One or more of the power outlets 104a through 104h may be unconnected to a battery charger, as depicted in FIG. 1 for power outlet 104e. Alternatively, all of the power outlets 104a through 104h may be connected to battery chargers. Batteries 108a through 108e are mounted on the battery chargers 106a, 106b, 106c, 106e, 106f, and 106g for recharging. One or more of the battery chargers 106a through 106g may be free of a battery, as depicted in FIG. 1 for battery charger 106d. Alternatively, each of the battery chargers 106a through 106g may have a battery mounted on it.

Each of the power channels 102a through 102h includes a relay 110a through 110h, respectively, in series with the corresponding power outlet 104a through 104h. The battery charger system 100 has a power input port 112 connected to each of the power outlet 104a through 104h through the respective relays 110a through 110h. Each of the relays 110a through 110h is operational for being configured in an ON state which enables current to flow from the power input port 112 to the respective power outlet 104a through 104h during operation of the battery charger system 100; each of the relays 110a through 110h is further operational for being configured in OFF state which prevents current from flowing from the power input port 112 to the respective power outlet 104a through 104h during operation of the battery charger system 100. The relays 110a through 110h may be manifested as electro-mechanical relays or solid state relays, for example. FIG. 1 schematically depicts relays 110a through 110c in the ON state, and relays 110d through 110h in the OFF state.

The battery charger system 100 has a controller 114 which is configured to provide ON state signals individually to the relays 110a through 110h, which causes the relays 110a through 110h receiving the ON state signals to be configured in the ON state, during operation of the battery charger system 100. The controller 114 is further configured to provide OFF state signals individually to the relays 110a through 110h, which causes the relays 110a through 110h receiving the OFF state signals to be configured in the OFF state, during operation of the battery charger system 100. The controller 114 provides the ON state signals and the OFF state signals to the relays 110a through 110h through one or more relay signal lines 116. The relay signal lines 116 may be manifested as wires, traces in a printed circuit board, or optical fibers, for example. Alternatively, the one or more relay signal lines 116 may be manifested by wireless transmission channels or terahertz conduits.

Each power channel 102a through 102h includes a current sensor 118a through 118h, respectively. The current sensors 118a through 118h may be manifested as step-down transformer current sensors in series between the power input port 112 and the respective relay 110a through 110h, as depicted schematically in FIG. 1. Alternatively, the current sensors 118a through 118h may be manifested as inductive pickup sensors, series resistors with differential voltage taps, or Hall effect magnetic sensors, for example. The current sensors 118a through 118h are configured to provide sensor signals to the controller 114 that correspond to the currents flowing through the respective power outlets 104a through 104h during operation of the battery charger system 100.

Each power channel 102a through 102h may optionally include a filter 120a through 120h coupled between the respective current sensor 118a through 118h and the controller 114 to condition the sensor signals. The filters 120a through 120h may be manifested as low pass filters, as indicated schematically in FIG. 1, with corner frequencies lower than frequencies of the currents through the power channels 102a through 102h. The currents through the power channels 102a through 102h commonly have frequencies of 60 hertz (Hz), or optionally 50 Hz, and the filters 120a through 120h may have corner frequencies less than 5 Hz, reducing oscillations in the sensor signals.

The controller 114 may be located in a same package as the relays 110a through 110h and the current sensors 118a through 118h. In such a case, the controller 114 may be manifested as a Rabbit microcontroller, an Arduino microcontroller, a Raspberry Pi microcomputer, or other programmable controller. Alternatively, the controller 114 may be implemented as a computer program and may be located in a computer, connected to the relays 110a through 110h and the current sensors 118a through 118h through a communication channel, such as a broadband cable or a wireless channel.

Figure 2A:
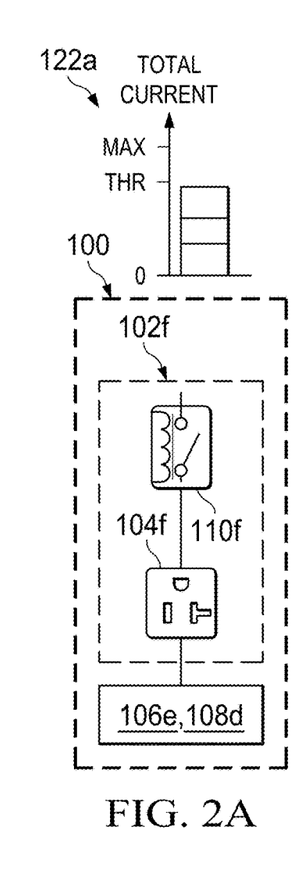
FIG. 2A through FIG. 2E schematically depict an aspect of an example method of the battery charger system providing power to a battery charger.

FIG. 2A through FIG. 2E schematically depict an aspect of an example method of the battery charger system 100 providing power to battery charger 106e through power channel 102f of FIG. 1. The controller 114 of FIG. 1 is configured to execute the steps disclosed in this aspect, and in reference to FIG. 2A through FIG. 2E. In this aspect, the battery charger system 100 has seven battery chargers 106a through 106g connected to the power outlets 104a through 104d and 104f through 104h, with six batteries 108a through 108f, as shown in FIG. 1. Relays 110a through 110c are in the ON state, as indicated in FIG. 1, and battery chargers 106a, 106b, and 106c are drawing current to charge batteries 108a, 108b, and 108c of FIG. 1. Referring to FIG. 2A, at the start of the method of this aspect, relay 110f is in the OFF state. Battery charger 106e with battery 108d is connected to relay 110f through power outlet 104f. The controller 114 of FIG. 1 generates a first total current estimate through the power channels 102a through 102h. The first total current estimate is determined by estimates of currents drawn by the three battery chargers 106a, 106b, and 106c, as indicated in a chart 122a of the first total current estimate. The first total current estimate is less than the maximum current limit, as indicated in chart 122a. In one version of this aspect, the first total current estimate may be less than a threshold current limit, as indicated in FIG. 2A. The threshold current limit is less than the maximum current limit. In another version, the first total current estimate may be more than the threshold current limit.

Figure 2B:
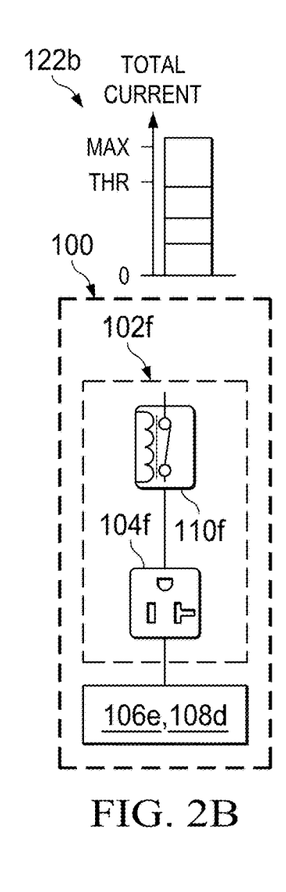

Referring to FIG. 2B, the controller 114 provides the on-state signal to the relay 110f, causing the relay 110f to be configured in the ON state, connecting the power input port 112 of FIG. 1 to the battery charger 106e with the battery 108d. The battery charger 106e draws current through the power channel 102f. The controller 114 generates a second total current estimate which is greater than the maximum current limit, as indicated in chart 122b.

Figure 2C:
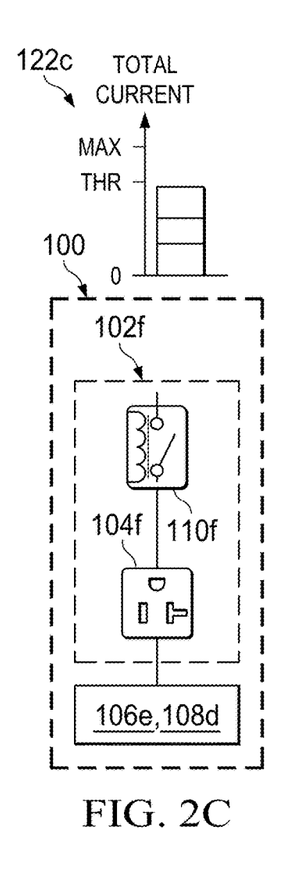

Referring to FIG. 2C, the controller 114 compares the second total current estimate to the maximum current limit. Because the second total current estimate is greater than the maximum current limit, the controller 114 provides the off state signal to the relay 110f, causing the relay 110f to be configured in the OFF state, stopping current from the power input port 112 to the battery charger 106e. The relays 110a, 110b, and 110c are left in the ON state. The controller 114 provides the off state signal to the relay 110f less than 1 second after providing the on state signal to the relay 110f, as disclosed in reference to FIG. 2B, to avoid tripping a circuit breaker controlling current to the battery charger system 100. The controller 114 generates a third total current estimate which is less than the maximum current limit, as indicated in chart 122c. The third total current estimate may be substantially equal to the second total current estimate, within current variations drawn by battery chargers, as a result of the short time intervals, that is, less than 1 second, between providing the on state signal to the relay 110f and subsequently providing the off state signal to the relay 110f.

Figure 2D:
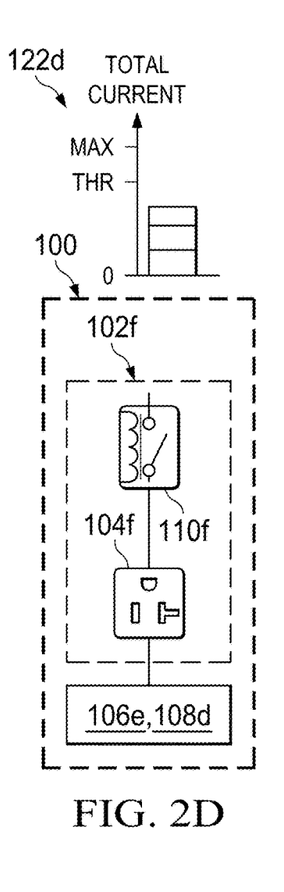

Referring to FIG. 2D, at a later time, for example, 1 minute to 10 minutes later, the currents drawn by the three battery chargers 106a, 106b, and 106c lessen, as a result of the batteries 108a, 108b, and 108c becoming partially or completely charged. The controller 114 generates a fourth total current estimate which is less than the threshold current limit, as indicated in chart 122d. The controller 114 may generate multiple total current estimates between the third total current estimate and the fourth total current estimate, as a result of the controller 114 receiving the sensor signals from the current sensors 118a through 118h and generating new total current estimates, multiple times each second.

Figure 2E:
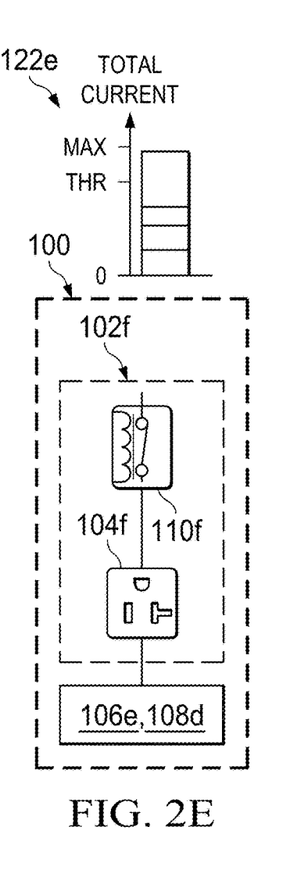

Referring to FIG. 2E, the controller 114 compares the fourth total current estimate to the threshold current limit. Because the fourth total current estimate is less than the threshold current limit, the controller 114 provides the on-state signal to the relay 110f, causing the relay 110f to be configured in the ON state, connecting the power input port 112 of FIG. 1 to the battery charger 106e with the battery 108d. The battery charger 106e draws current through the power channel 102f. After the relay 110f is configured in the ON state, the controller 114 generates a fifth total current estimate which is less than the maximum current limit, as indicated in chart 122e. The controller 114 compares the fifth total current estimate to the maximum current limit. Because the fifth total current estimate is less than the maximum current limit, the relay 110f is left in the ON state, allowing the battery charger 106e to charge the battery 108d.

FIG. 3A through FIG. 3D schematically depict another aspect of an example method of the battery charger system 100 providing power to battery chargers 106g and 106h of FIG. 1. The controller 114 of FIG. 1 is configured to execute the steps disclosed in this aspect, and in reference to FIG. 3A through FIG. 3D. In this aspect, the battery charger system 100 has seven battery chargers 106a through 106g connected to the power outlets 104a through 104d and 104f through 104h, with five batteries 108a through 108e, as shown in FIG. 1. In this aspect, relays 110a, 110b, 110c, and 110f are in the ON state, and battery chargers 106a, 106b, 106c, and 106e are drawing current to charge batteries 108a, 108b, 108c, and 108d. Relays 110d, 110e, 110g, and 110h are in the OFF state. Battery charger 106f with battery 108e is coupled to relay 110g. Battery charger 106g with battery 108f is coupled to relay 110h.

Figure 3A:
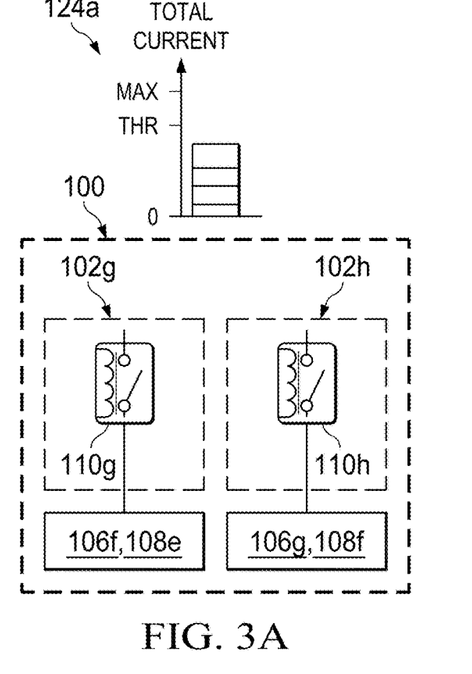
FIG. 3A through FIG. 3D schematically depict another aspect of an example method of the battery charger system providing power to battery chargers.

Referring to FIG. 3A, at the start of the method of this aspect, the controller 114 of FIG. 1 generates a first total current estimate through the power channels 102a through 102h. The first total current estimate is determined by estimates of currents drawn by the four battery chargers 106a, 106b, 106c, and 106e, as indicated in a chart 124a of the first total current estimate. The first total current estimate is less than the maximum current limit, as indicated in chart 124a. In one version of this aspect, the first total current estimate may be less than the threshold current limit, as indicated in FIG. 3A. In another version, the first total current estimate may be more than the threshold current limit.

Figure 3B:
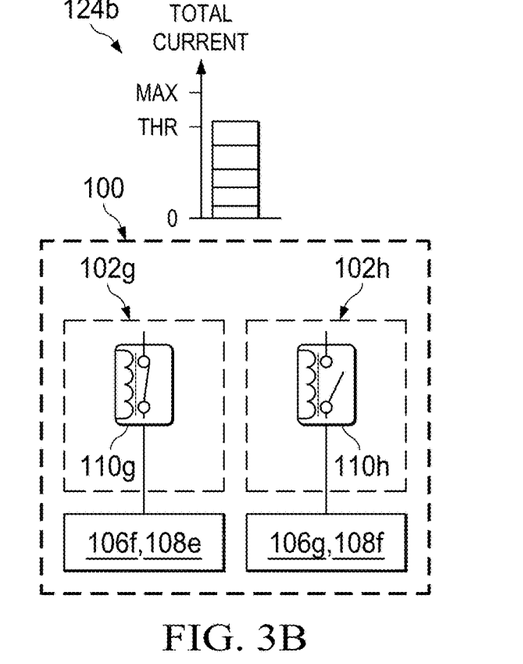

Referring to FIG. 3B, because the first total current estimate is less than the maximum current limit, the controller 114 provides the on-state signal to the relay 110g, causing the relay 110g to be configured in the ON state, connecting the power input port 112 of FIG. 1 to the battery charger 106f with the battery 108e. The battery charger 106f draws current through the power channel 102g. The controller 114 generates a second total current estimate which is less than the maximum current limit, as indicated in chart 124b.

Figure 3C:
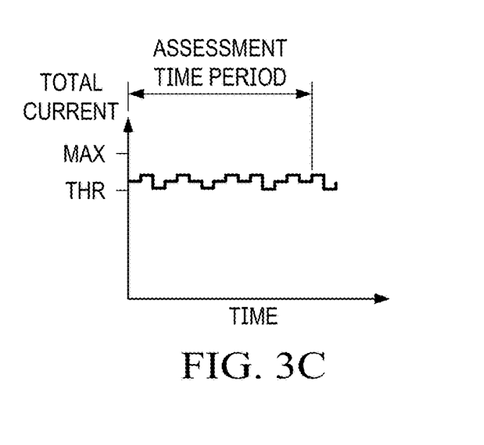

Referring to FIG. 3C, the controller 114 generates multiple total current estimates during an assessment time period. The assessment time period is sufficiently long to enable a reliable assessment of a range of the total current. The assessment time period may be 5 seconds to 60 seconds, by way of example. The controller 114 compares the total current estimates during the assessment time period to the maximum current limit. If the total current estimates are less than the maximum current limit, as indicated in FIG. 3C, relay 110g is left in the ON state.

Figure 3D:
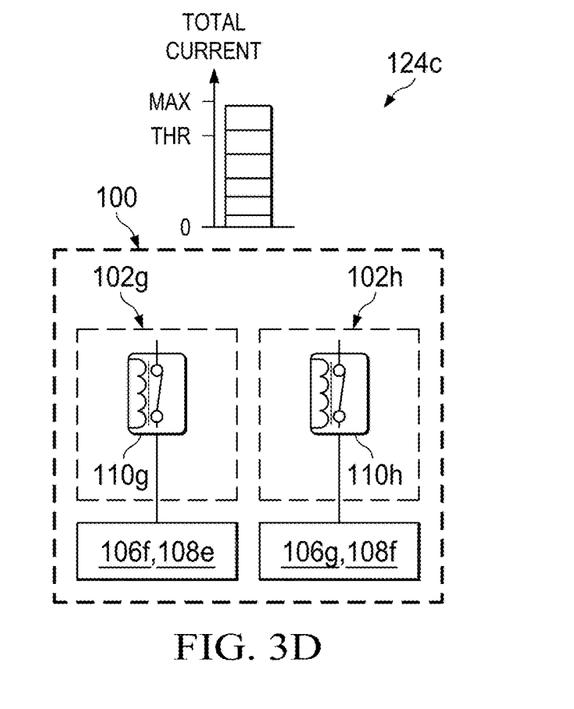

Referring to FIG. 3D, after the assessment time period of FIG. 3C is over, and the total current estimates are less than the maximum current limit, the controller 114 provides the on-state signal to the relay 110h, causing the relay 110h to be configured in the ON state, connecting the power input port 112 of FIG. 1 to the battery charger 106g with the battery 108f. The battery charger 106g draws current through the power channel 102h. The controller 114 generates a third total current estimate, which may be less than the maximum current limit, as indicated in chart 124c.

The method disclosed in reference to FIG. 3A through FIG. 3D, that is, connecting the power input port to a first new battery charger, comparing the total current estimates during the assessment time period to the maximum current limit, and then connecting the power input port to a second new battery charger, may advantageously enable concurrent charging of a plurality of batteries while maintaining the total current below the maximum current limit.

Figure 4:
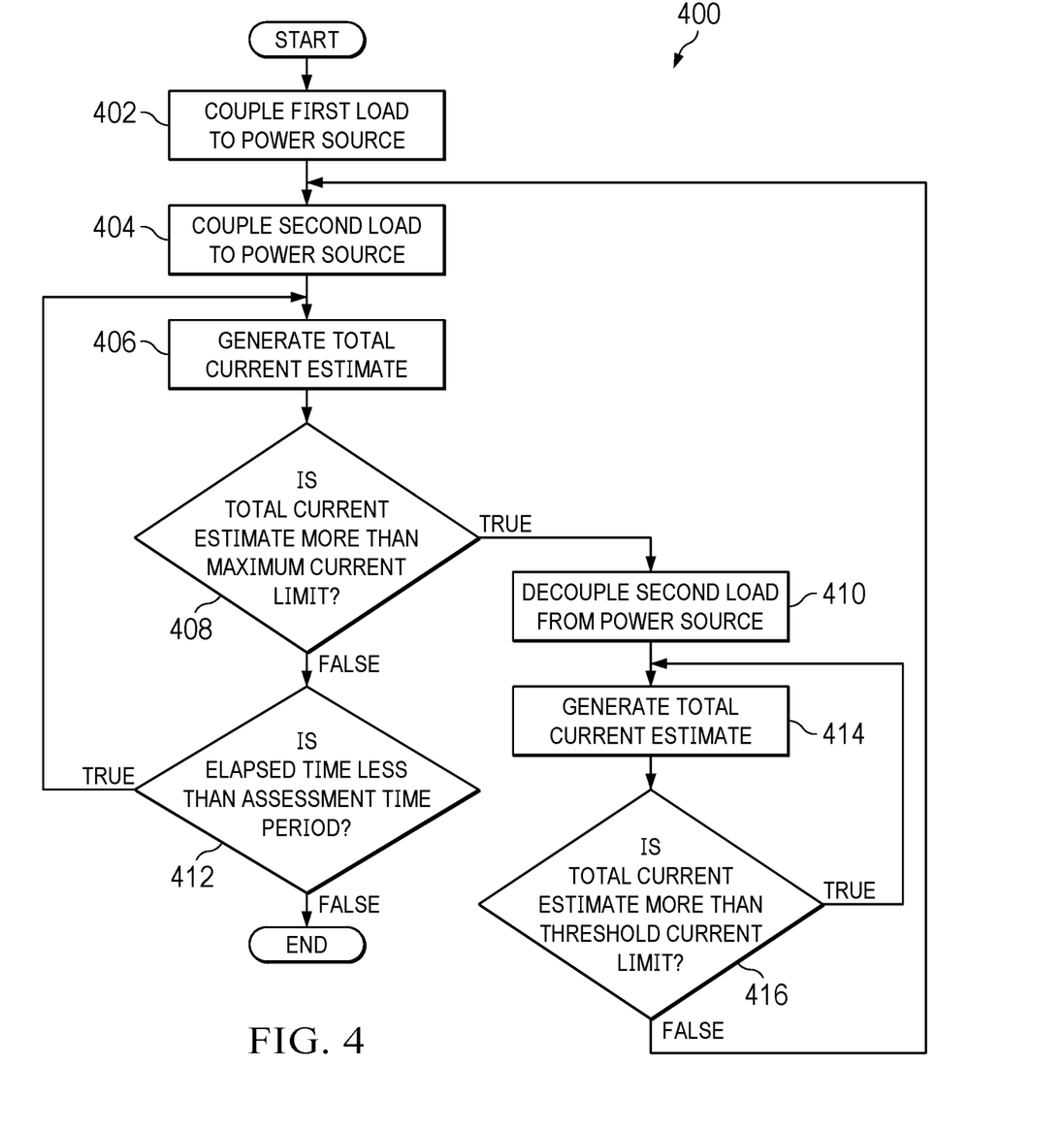
FIG. 4 is a flowchart of an example method of charging multiple batteries using a battery charger system.

FIG. 4 is a flowchart of an example method of charging multiple batteries using a battery charger system. The battery charger system 100 of FIG. 1 is configured to execute the steps disclosed in reference to FIG. 4. The method 400 begins with step 402, which is to couple a first load to a power source. For the battery charger system 100 of FIG. 1, step 402 may be implemented by the controller 114 providing the on-state signal to relay 110a, causing relay 110a to be configured in the ON state. When relay 110a is configured in the ON state, battery charger 106a is coupled to the power input port 112, and battery 108a begins charging, drawing current through the power channel 102a.

The method continues with step 404, which is to couple a second load to the power source, while the first load is coupled to the power source. For the battery charger system 100, step 404 may be implemented by the controller 114 providing the on-state signal to relay 110b, causing relay 110b to be configured in the ON state, while relay 110a is configured in the ON state. When relay 110b is configured in the ON state, battery charger 106b is coupled to the power input port 112, and battery 108b begins charging, drawing current through the power channel 102b.

The method continues with step 406, which is to generate a total current estimate of a total current through the battery charger system. For the battery charger system 100, step 406 may be implemented by the current sensors 118a through 118h providing sensor signals to the controller 114. The sensor signals correspond to currents through the power channels 102a through 102h. The controller 114 generates the total current estimate using the sensor signals. In one implementation of step 406, the controller 114 may generate channel current estimates of currents through each of the power channels 102a through 102h using the sensor signals from the respective current sensors 118a through 118h, and adding the channel current estimates to generate the total current estimate. In another implementation, the controller 114 may add the channel current estimates and add an estimate of current consumed by the controller 114 to generate the total current estimate. Other methods of generating the total current estimate are within the scope of this example.

The method continues with step 408, which is a decision step. The controller 114 compares the total current estimate generated in step 406 to the maximum current limit. If the total current estimate is more than the maximum current limit, the method branches to step 410. If the total current estimate is not more than the maximum current limit, the method branches to step 412.

Step 410 is executed if the total current estimate is more than the maximum current limit, as resolved in step 408. In step 410, the second load is decoupled from the power source. For the battery charger system 100, step 410 may be implemented by the controller 114 providing the off-state signal to relay 110b, causing relay 110b to be configured in the OFF state, while relay 110a is configured in the ON state. When relay 110b is configured in the OFF state, battery charger 106b is decoupled from the power input port 112, and battery 108b ceases charging. Current through the power channel 102b drops to essentially zero.

Following step 410, the method continues with step 414, which is to generate a new total current estimate of a total current through the battery charger system. For the battery charger system 100, step 414 may be implemented as disclosed in reference to step 406. Step 414 may include a delay of a few milliseconds to 1 second, to enable other operations to be executed by the battery charger system.

Following step 414, the method continues with step 416, which is a decision step. The controller 114 compares the new total current estimate generated in step 414 to the threshold current limit. If the new total current estimate is more than the threshold current limit, the method branches back to step 414. If the total current estimate is not more than the threshold current limit, the method branches back to step 404. Thus, steps 404, 406, 408, 410, 414, and 416 combine to provide current to the second load while maintaining the total current estimate below the maximum current limit.

Step 412 is executed if the total current estimate is not more than the maximum current limit, as resolved in step 408. Step 412 is a decision step. The controller 114 compares the time elapsed since step 408 was completed to the assessment time period; the assessment time period is disclosed in reference to FIG. 3C. If the time elapsed since step 408 was completed is less than the assessment time period, the method branches back to step 406. If the time elapsed since step 408 was completed is not less than the assessment time period, the method terminates, leaving the second load connected to the power source.

The method of FIG. 4 may be sequentially repeated with additional loads coupled to additional power channels of the battery charger system 100. The method of FIG. 4 may thus provide current to the all the loads coupled to the battery charger system 100 while maintaining the total current estimate below the maximum current limit, without need for user interaction after the loads are initially coupled to the battery charger system 100.

Figure 5A:
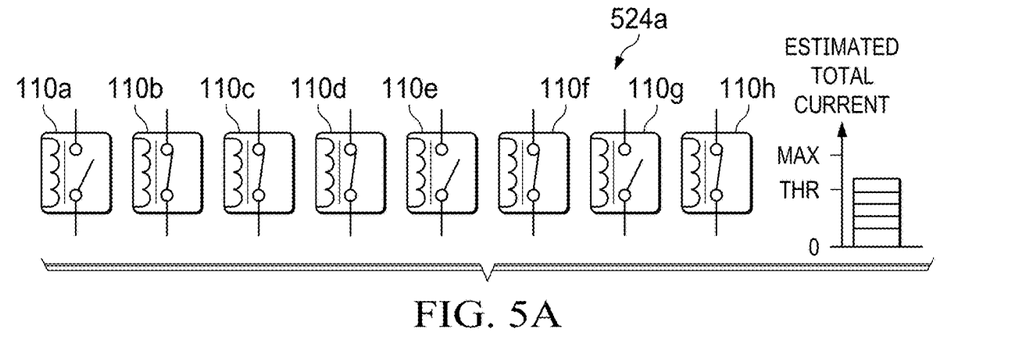
FIG. 5A through FIG. 5J schematically depict a further aspect of an example method of the battery charger system providing power to battery chargers.

FIG. 5A through FIG. 5J schematically depict a further aspect of an example method of the battery charger system 100 providing power to battery chargers 106g and 106h of FIG. 1. The battery charger system 100 of FIG. 1 is configured to execute the steps disclosed in reference to FIG. 5A through FIG. 5J. In this example, battery chargers with batteries are coupled to all of the power channels 102a through 102h of the battery charger system 100. Referring to FIG. 5A, relays 110b, 110c, 110d, 110f, and 110h are configured in the ON state. Relays 110a, 110e, and 110g are configured in the OFF state. Current flows through relays 110b, 110c, 110d, 110f, and 110h, while essentially no current flows through relays 110a, 110e, and 110g. A total current estimate, generated by the controller 114 of FIG. 1, is less than the maximum current limit, as indicated in the current chart 524a.

Figure 5B:
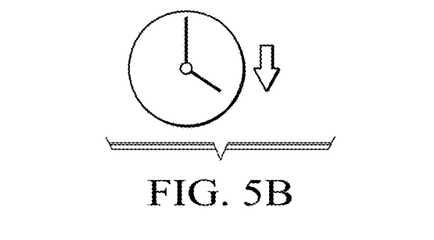

Referring to FIG. 5B, at a first defined time, a first sequential sweep of relays in the OFF state is executed, in which the controller 114 provides the on-state signal to the relays that are in the OFF state at the first defined time, in sequence. The first sequential sweep is depicted in FIG. 5C through FIG. 5F.

Figure 5C:
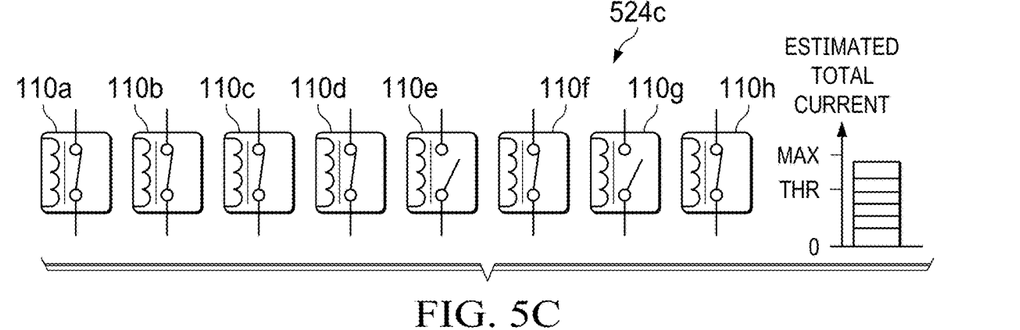

Referring to FIG. 5C, the controller 114 provides the on-state signal to the first relay in the OFF state, in this case, relay 110a. The on-state signal causes relay 110a to be configured in the ON state, and current flows through relay 110a to the battery charger coupled to relay 110a. The total current estimate increases, but remains less than the maximum current limit, as indicated in the current chart 524c. Relay 110a is left in the ON state. Relay 110a may be left in the ON state for the assessment time period, as disclosed in reference to FIG. 3C and steps 408 and 412 of FIG. 4, before proceeding to the next relay in the OFF state, while the total current estimate is updated and monitored to establish the total current estimate is less than the maximum current limit.

Figure 5D:
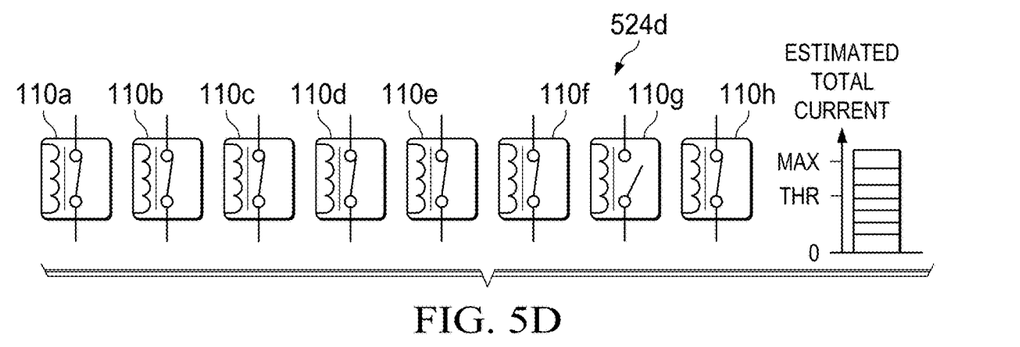

Referring to FIG. 5D, the controller 114 provides the on-state signal to the next relay in the OFF state, in this case, relay 110e. The on-state signal causes relay 110e to be configured in the ON state, and current flows through relay 110e to the battery charger coupled to relay 110e. The total current estimate increases, and is now more than the maximum current limit, as indicated in the current chart 524d.

Figure 5E:
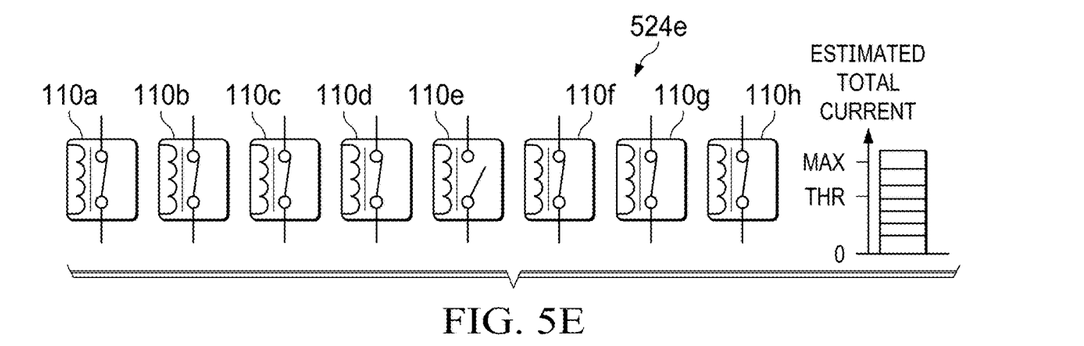

Referring to FIG. 5E, because the total current estimate is more than the maximum current limit, the controller 114 provides the off-state signal to the last relay to receive the on-state signal, in this case, relay 110e. The off-state signal causes relay 110e to be configured in the OFF state. Current through relay 110e drops to essentially zero, and the total current estimate drops below the maximum current limit.

The controller 114 subsequently provides the on-state signal to the next relay in the OFF state, in this case, relay 110g. The on-state signal causes relay 110g to be configured in the ON state, and current flows through relay 110g to the battery charger coupled to relay 110g. The total current estimate increases, and is now more than the maximum current limit, as indicated in the current chart 524e.

Figure 5F:
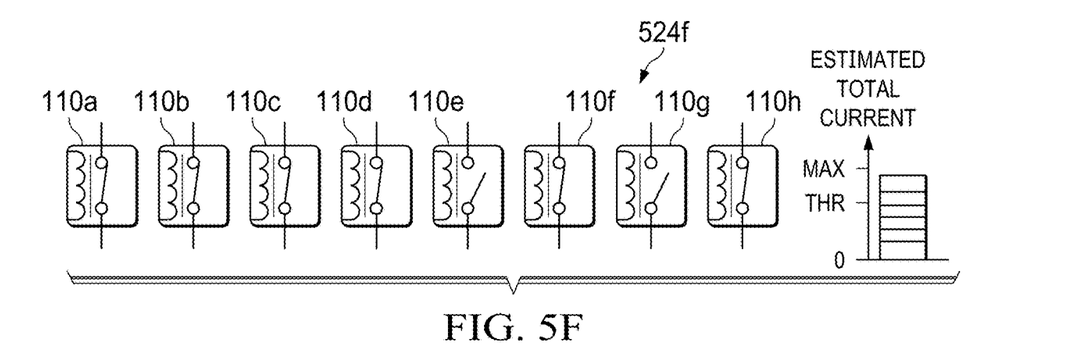

Referring to FIG. 5F, because the total current estimate is more than the maximum current limit, the controller 114 provides the off-state signal to the last relay to receive the on-state signal, in this case, relay 110g. The off-state signal causes relay 110g to be configured in the OFF state. Current through relay 110g drops to essentially zero, and the total current estimate drops below the maximum current limit, as indicated in the current chart 524f.

The first sequential sweep is completed. The relays that were in the OFF state at the beginning of the first sequential sweep have been sequentially configured in the ON state. The relays that were configured in the ON state, and resulted in the total current estimate staying below the maximum current limit, in this case, relay 110a, were left in the ON state. The total current estimate was maintained below the maximum current limit, by providing the off-state signal to the last relays to receive the on-state signal, when the total current estimate rose above the maximum current limit.

Figure 5G:
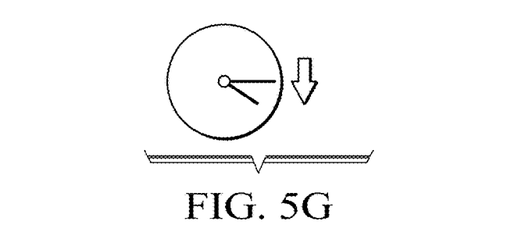

Referring to FIG. 5G, at a second defined time, a second sequential sweep of relays in the OFF state is executed, in which the controller 114 provides the on-state signal to the relays that are in the OFF state at the second defined time, in sequence. The first defined time and the second defined time may be separated by a sweep iteration period, such as 10 minutes to 30 minutes. During the time between the first defined time and the second defined time, the battery chargers that are connected may draw less current, as the batteries become partially or fully charged, providing current capacity to connect one or more relays that are in the OFF state. The second sequential sweep is depicted in FIG. 5H through FIG. 5J.

Figure 5H:
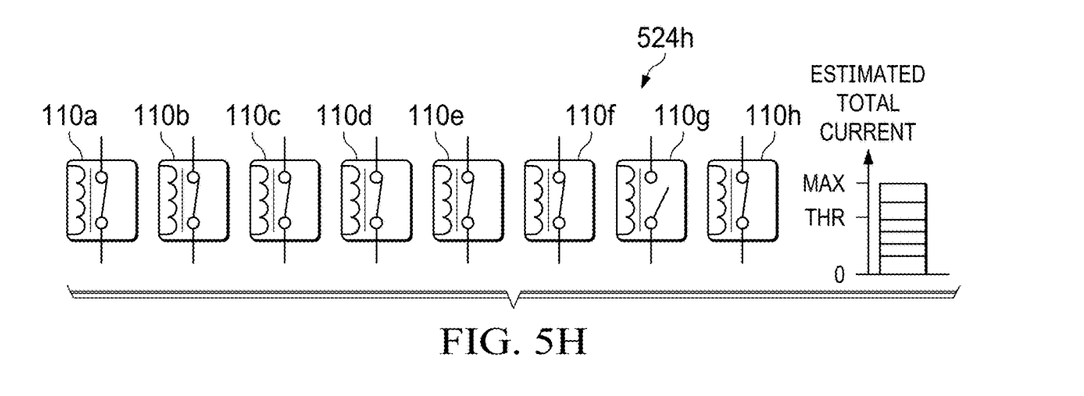

Referring to FIG. 5H, the controller 114 provides the on-state signal to the first relay in the OFF state, in this case, relay 110e. The on-state signal causes relay 110e to be configured in the ON state, and current flows through relay 110e to the battery charger coupled to relay 110e. The total current estimate increases, but remains less than the maximum current limit, as indicated in the current chart 524h. Relay 110e is left in the ON state. Relay 110e may be left in the ON state for the assessment time period, before proceeding to the next relay in the OFF state, as disclosed in reference to FIG. 5C.

Figure 5I:
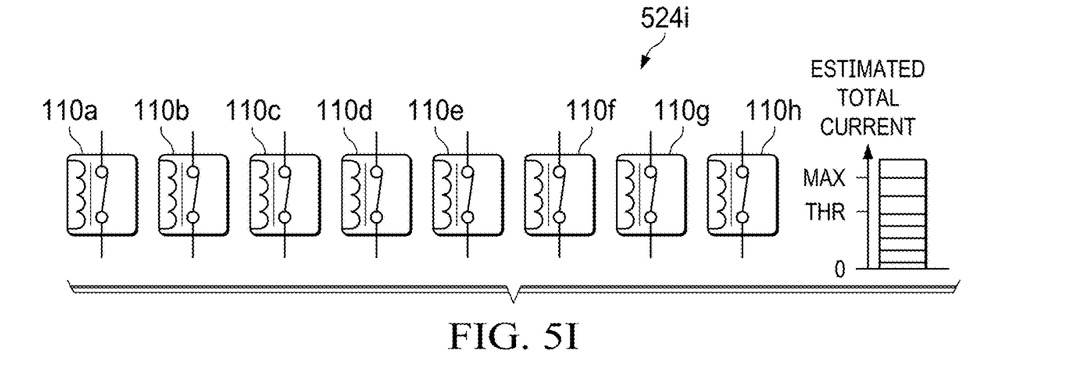

Referring to FIG. 5I, the controller 114 provides the on-state signal to the next relay in the OFF state, in this case, relay 110g. The on-state signal causes relay 110g to be configured in the ON state, and current flows through relay 110g to the battery charger coupled to relay 110g. The total current estimate increases, and is now more than the maximum current limit, as indicated in the current chart 524i.

Figure 5J:
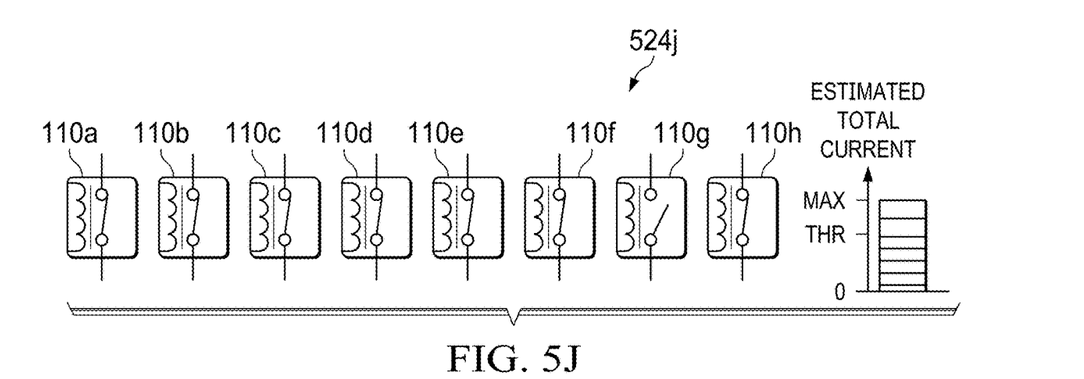

Referring to FIG. 5J, because the total current estimate is more than the maximum current limit, the controller 114 provides the off-state signal to the last relay to receive the on-state signal, in this case, relay 110g. The off-state signal causes relay 110g to be configured in the OFF state. Current through relay 110g drops to essentially zero, and the total current estimate drops below the maximum current limit, as indicated in the current chart 524j.

The second sequential sweep is completed. The relays that were in the OFF state at the beginning of the second sequential sweep have been sequentially configured in the ON state. The relays that were configured in the ON state, and resulted in the total current estimate staying below the maximum current limit, in this case, relay 110e, were left in the ON state. The total current estimate was maintained below the maximum current limit by providing the off-state signal to the last relays to receive the on-state signal, when the total current estimate rose above the maximum current limit.

Sequential sweeps may be repeated at defined times separated by the sweep iteration period, to efficiently charge batteries while maintaining the total current estimate below the maximum current limit. As batteries on battery chargers coupled to the battery charger system 100 are charged, current to the batteries reduces, enabling more relays to be configured in the ON state and remain in the ON state during the sequential sweeps, culminating in all the batteries being charged, advantageously without requiring user interaction.

Figure 6:
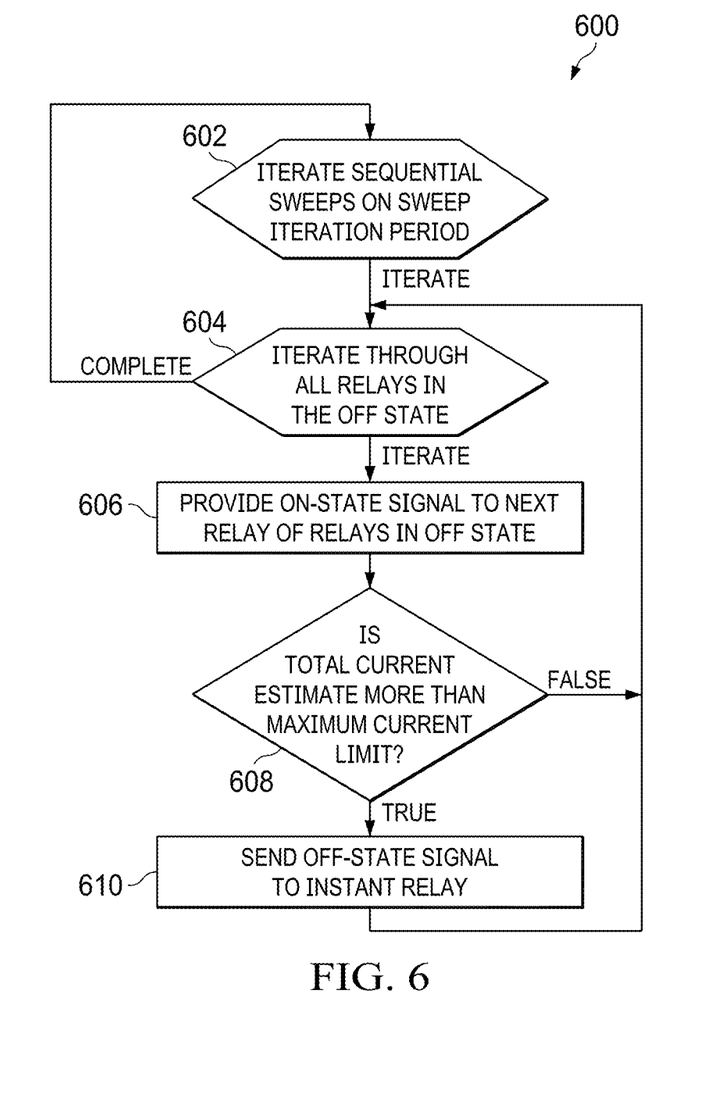
FIG. 6 is a flowchart of the method disclosed in reference to FIG. 5A through FIG. 5J.

FIG. 6 is a flowchart of the method disclosed in reference to FIG. 5A through FIG. 5J. The method 600 begins with step 602 which is to iterate sequential sweeps of the relays 110a through 110h that are in the OFF state. The sequential sweeps are iterated at defined times separated by the sweep iteration period. In each iteration, steps 604 through 608 are executed, and step 610 may be executed.

The first step in each iteration of the sequential sweeps is step 604, which is to iterate through all the relays in the OFF state. The relays may be addressed in numerical sequence, or in another order.

For each relay being addressed, the first step in the sequential sweep is step 606, which is to provide the on-state signal to next relay of the relays in the OFF state. The relay receiving the on-state signal becomes configured in the ON state. If a load, for example a battery charger with a battery, is coupled to the relay in the ON state, current will flow through the relay to the load.

Following step 606, step 608 is executed, which is a decision step. In step 608 a total current estimate through the battery charger system is compared to the maximum current limit. The total current estimate is generated by the controller 114 of FIG. 1, using the sensor signals from the current sensors 118a through 118h. If the total current estimate is more than the maximum current limit, the method branches to step 610. If the total current estimate is not more than the maximum current limit, the relay that was turned on in step 608 is left in the ON state, and the method branches back to step 604. The relay may be left in the ON state for the assessment time period, as disclosed in reference to FIG. 3C and steps 408 and 412 of FIG. 4, before proceeding to step 604, while the total current estimate is updated and monitored to establish the total current estimate is less than the maximum current limit.

Step 610 is executed if the total current estimate is not more than the maximum current limit, as determined in decision step 608. In step 610, the last relay that was provided with the on-state signal is now provided with the off-state signal, causing the relay to be configured in the OFF state. Thus, the total current estimate is maintained below the maximum current limit, advantageously without requiring user interaction.

In one version of this example, the iterations of the sequential sweeps as disclosed in reference to step 602 may be executed a fixed number of times. In another version, the iterations of the sequential sweeps may be executed until all the relays are in the ON state. In a further version, the iterations of the sequential sweeps may be executed continuously while the battery charger system is operating.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:
1. A battery charger system, comprising:
a power input port;
a first power channel, including:
  a first power outlet electrically coupled to the power input port through a first relay, the first relay operational for being configured in an ON state when the first relay receives an on-state signal, wherein the ON state enables a first current to flow from the power input port to the first power outlet, the first relay operational for being configured in an OFF state, when the first relay receives an off-state signal, wherein the OFF state prevents current from flowing from the power input port to the first power outlet; and
a first current sensor configured to provide first sensor signals corresponding to the first current;
a second power channel, including:
a second power outlet electrically coupled to the power input port through a second relay, the second relay operational for being configured in an ON state when the second relay receives an on-state signal, wherein the ON state enables a second current to flow from the power input port to the second power outlet, the second relay operational for being configured in an OFF state, when the second relay receives an off-state signal, wherein the OFF state prevents current from flowing from the power input port to the second power outlet; and
a second current sensor configured to provide second sensor signals corresponding to the second current;
a plurality of additional power channels, each of the plurality of additional power channels including:
an additional power outlet electrically coupled to the power input port through an additional relay, the additional relay operational for being configured in an ON state when the additional relay receives an on-state signal, wherein the ON state enables an additional current to flow from the power input port to the additional power outlet, the additional relay operational for being configured in an OFF state, when the additional relay receives an off-state signal, wherein the OFF state prevents current from flowing from the power input port to the additional power outlet;
a plurality of additional current sensors configured to provide plurality of additional sensor signals corresponding to the plurality of additional currents; and
a controller, the controller configured to:
provide a first on-state signal to the first relay;
provide a second on-state signal to the second relay, while the first relay is in the ON state;
generate a first total current estimate of current through the power input port, using the first sensor signals and the second sensor signals, while the first relay is in the ON state and the second relay is in the ON state;
compare the first total current estimate to a maximum current limit;
provide an off-state signal to the last relay that was provided an on state signal, that is, the second relay, while the first total current estimate is more than the maximum current limit;
subsequently generate a second total current estimate of current through the power input port, using the first sensor signals and the second sensor signals, while the first relay is in the ON state and the second relay is in the OFF state;
compare the second total current estimate to a threshold current limit, the threshold current limit being less than the maximum current limit;
provide a third on-state signal to the second relay, while the first relay is in the ON state, when the second total current estimate is less than the threshold current limit;
performing a sequential sweep by performing the steps (a) through (e) below, sequentially for each relay in a set of OFF state relays from the additional relays that are in their OFF state, the set of OFF state relays being numbered sequentially from 1, and n is set to 1:
 (a) providing the on state signal to an n-th relay of the OFF state relays;
 (b) determining whether, when the n-th relay is provided with the on state signal, the total current estimate is less than the maximum current limit;
 (c) if the total current estimate is less than the maximum current limit, keeping the n-th relay provided with the on state signal in the ON state;
 (d) if the total current estimate is greater than the maximum current limit, then turning the n-th relay provided with the on state signal in the OFF state;
 (e) incrementing n to be n+1 and repeating steps (a) through (d) until the n-th relay is a final sequential relay of the set of OFF state relays; and
repeating the sequential sweep at predetermined time intervals with remaining relays that are in the set of OFF state relays.

2. The battery charger system of claim 1, wherein the controller is configured to repetitively generate the second total current estimate and compare the second total current estimate to the maximum current limit for an assessment time period, before providing the second on-state signal to the second relay.

3. The battery charger system of claim 2, wherein the controller is configured to provide the off-state signal to the first relay during the assessment time period, when the second total current estimate is more than the maximum current limit.

4. The battery charger system of claim 2, wherein the assessment time period is 5 seconds to 60 seconds.

5. The battery charger system of claim 1, wherein the controller is configured to generate the total current estimates at a rate greater than 10 times per second.

6. The battery charger system of claim 1, wherein the controller is configured to provide an off-state signal to a last relay that was provided an on-state signal, when the total current estimate is more than the maximum current limit, within 1 second.

7. The battery charger of claim 1, wherein the controller is configured to initiate sequentially providing the on-state signal to every relay that is in the OFF state, at fixed intervals.

8. The battery charger of claim 7, wherein the fixed intervals are 10 minutes to 60 minutes.

9. The battery charger system of claim 1, wherein the first power channel includes a first filter electrically coupled between the first current sensor and the controller, and the second power channel includes a second filter electrically coupled between the second current sensor and the controller.

10. The battery charger system of claim 9, wherein the first filter is a first low pass filter, and the second filter is a second low pass filter.

11. The battery charger system of claim 1, wherein the maximum current limit is 15 amps to 18 amps.

12. The battery charger system of claim 1, wherein the threshold current limit is 60 percent to 80 percent of the maximum current limit.

13. A battery charger system, comprising:
a power input port;
a plurality of power channels, each power channel including:
a power outlet electrically coupled to the power input port through a relay, the relay operational for being configured for an ON state when the relay receives an on-state signal, which enables current to flow from the power input port to the power outlet, and operational for being configured for an OFF state when the relay receives an off-state signal, which prevents current from flowing from the power input port to the power outlet; and a current sensor configured to provide sensor signals corresponding to the current; and a controller configured to:

generate estimates of the currents through the power channels using the sensor signals;

generate total current estimates through the power input port, using the estimates of the currents through the power channels;

perform a sequential sweep by performing the steps (a) through (e) below, sequentially for each relay in a set of OFF state relays from the relays that are in their OFF state, the set of OFF state relays being numbered sequentially from 1, and n is set to 1:
  (a) providing the on state signal to an n-th relay of the OFF state relay;
  (b) determining whether, when the n-th relay is provided with the on state signal, the total current estimate is less than the maximum current limit;
  (c) if the total current estimate is less than the maximum current limit, keeping the n-th relay provided with the on state signal in the ON state;
  (d) if the total current estimate is greater than the maximum current limit, then turning the n-th relay provided with the on state signal in the OFF state; and
  (e) incrementing n to be n+1 and repeating steps (a) through (d) until the n-th relay is a final sequential relay of the set of OFF state relays;

continue to generate the total current estimates until the total current estimate is less than a current threshold, the current threshold being less than the maximum current limit; and repeat the sequential sweep with remaining relays that are in the set of OFF state relays when the total current estimate is less than the current threshold.

14. The battery charger of claim 13, wherein the battery charger system has eight power channels.

15. The battery charger system of claim 13, wherein the controller is configured to provide an off-state signal to a last relay that was provided an on-state signal, when the total current estimate is more than the maximum current limit, within 1 second.

16. The battery charger system of claim 13, wherein the controller is further configured to initiate the process of sequentially providing the on-state signal to every relay that is in the OFF state, at fixed intervals.

17. A battery charger system, comprising:

a power input port;

a plurality of power channels, each power channel including:

a power outlet electrically coupled to the power input port through a relay, the relay operational for being configured for an ON state when the relay receives an on-state signal, which enables current to flow from the power input port to the power outlet, and operational for being configured for an OFF state when the relay receives an off-state signal, which prevents current from flowing from the power input port to the power outlet;

a current sensor configured to provide a sensor signal corresponding to the current; and a controller configured to:

generate estimates of the currents through the power channels using the sensor signals;

perform a sequential sweep by performing the steps (a) through (e) below, sequentially for each relay in a set of OFF state relays from the relays that are in their OFF state, the set of OFF state relays being numbered sequentially from 1, and n is set to 1:
  (a) providing the on state signal to an n-th relay of the OFF state relay;
  (b) determining whether, when the n-th relay is provided with the on state signal, the total current estimate is less than the maximum current limit;
  (c) if the total current estimate is less than the maximum current limit, keeping the n-th relay provided with the on state signal in the ON state;
  (d) if the total current estimate is greater than the maximum current limit, then turning the n-th relay provided with the on state signal in the OFF state; and
  (e) incrementing n to be n+1 and repeating steps (a) through (d) until the n-th relay is a final sequential relay of the set of OFF state relays; and repeat the sequential sweep with remaining relays that are in the set of OFF state relays when the total current estimate is less than the current threshold.

18. The battery charger system of claim 17, wherein the controller is configured to provide the off state signal to the last relay that was provided the on-state signal within 1 second of when the total current estimate is more than the maximum current limit.

* * * * *